United States Patent [19]

Keating

[11] 4,017,868
[45] Apr. 12, 1977

[54] THERMAL RECORDER

[75] Inventor: Daniel William Keating, Wayland, Mass.

[73] Assignee: American Optical Corporation, Southbridge, Mass.

[22] Filed: Nov. 28, 1975

[21] Appl. No.: 636,329

[52] U.S. Cl. .............................. 346/61; 346/76 R
[51] Int. Cl.² ................. G01D 9/28; G01D 15/10
[58] Field of Search ............. 346/76 R, 33 ME, 50, 346/61

[56] References Cited

UNITED STATES PATENTS

| 3,153,562 | 10/1964 | Witzany | 346/50 X |
| 3,754,279 | 8/1973 | Valenti et al. | 346/76 R |
| 3,757,350 | 9/1973 | Fliegner et al. | 346/76 R X |
| 3,879,738 | 4/1975 | Riedl | 346/76 R |

Primary Examiner—George H. Miller, Jr.
Attorney, Agent, or Firm—Albert H. Graddis; Jeremiah J. Duggan

[57] ABSTRACT

A thermographic strip chart recorder for the recording of medical data includes a thermo printout head for the digital recording of additional medical data. Thermo sensitive paper is transported from a supply spool over a knife edge member and across a platen. Both a galvanometrically controlled thermo stylus for recording analog data and the thermo printout head are aligned to produce their respective indicia on that portion of the paper in contact with the apex of the knife edge. The thermo printout head permits the recording of digitally coded or alphanumeric data relative to the patient in real time registration with the analog information. Physical location of the thermo printout head along the knife edge permits viewing of the paper as it crosses the platen without obstruction.

7 Claims, 4 Drawing Figures

U.S. Patent  April 12, 1977  4,017,868
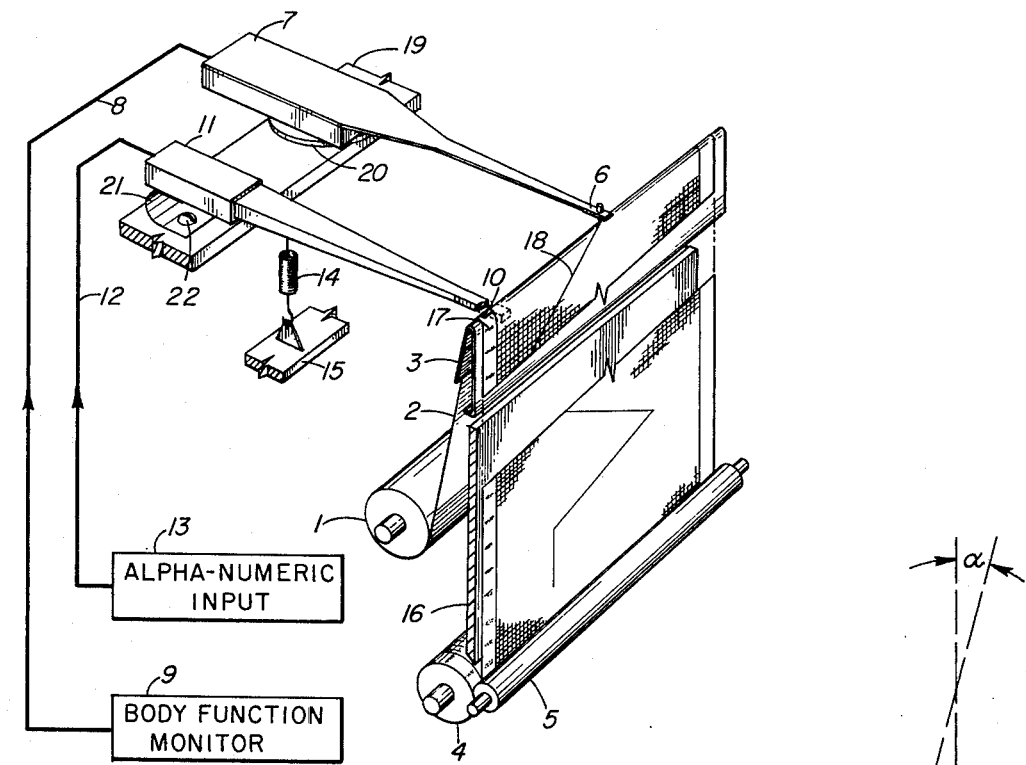
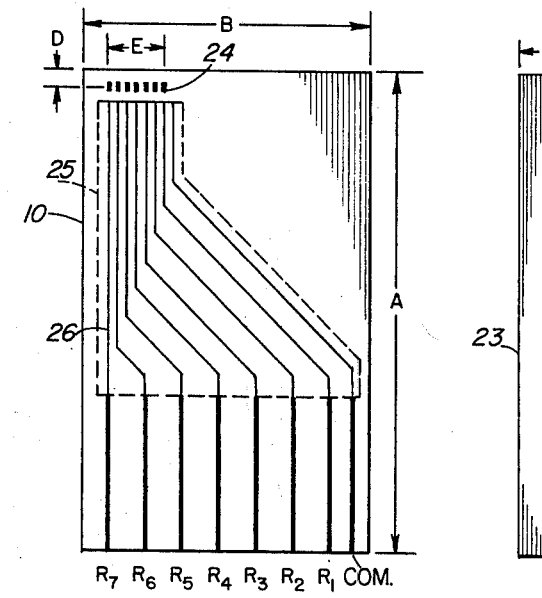
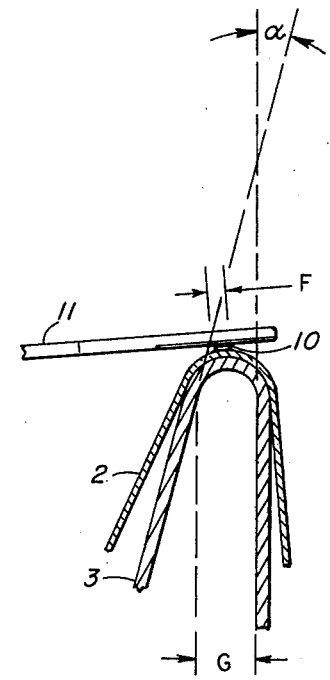

THERMAL RECORDER

BACKGROUND OF THE INVENTION

The invention relates to a strip chart recorder, and more particularly to a thermographic device for the recording of medical data.

When monitoring vital functions of a human being such as heart or brain induced electrical signals, it is frequently important to record other data pertinent to the patient. Rather prosaic but nonetheless important is identification indicia.

U.S. Pat. No. 3,754,279 issued on Aug. 21, 1973 to Valenti et al discloses a thermal recorder designed to accomplish this purpose. It describes a thermographic recorder incorporating, in addition to the normal galvanometrically driven thermal stylus for indicating analog body function, a thermal printout head for recording numeric characters.

In prior art devices the thermal printout head (TPH) is located on a viewing platen remotely of the stylus and is used to note pertinent but exogenous medical data, mainly relating to patient identification. Recorders of this design do have significant disadvantages and introduce limitations. Placement of the TPH on the platen obscures observation of the recorded data by medical personnel and both esthetically and structurally encumbers the frontal aspect of the unit.

More importantly, prior art location of TPH renders practically impossible the real time recording of digital data in time registration with recorded analog functions. Hence, prior art print head devices are practically limited to the recording of information extrinsic to the body function of the individual being observed.

SUMMARY OF THE INVENTION

To overcome problems of the prior art and in providing an improved thermal recorder, the present invention contemplates a medical data electrically driven thermo responsive strip chart recorder. A strip of thermally sensitive chart paper is controlled to move at a predetermined linear speed and direction. A knife edge is disposed transversely and has at least a portion of its apex in contact with the strip. Medical data is applied to the strip by a galvanometrically controlled thermal stylus and a TPH, both recording their respective data on the strip along its region of contact with the knife edge.

Accordingly, it is an object of the invention to provide an improved thermally responsive strip chart medical data recorder.

Another object is to provide a TPH for recording medical data in real time coordination with a galvanometrically driven stylus.

Another object of the invention is to provide for the recording of data at point removed from the viewing platen of the recorder.

Yet another object of the invention is recording medical data in digital form in time registration with recorded analog information.

These and other objects and features of the invention will become apparent upon consideration of the ensuing description and the accompanying drawings.

DESCRIPTION OF THE DRAWINGS

FIG. 1 is a perspective schematic partial representation of a thermographic recorder embodying the features of the invention.

FIG. 2 is an enlarged plan view of a TPH which may be employed in the novel recorder.

FIG. 3 is a side view of TPH of FIG. 2.

FIG. 4 is an enlarged schematic partial side view of TPH in contact with the strip chart.

Conventional symbols are used throughout the drawings and like numbers designate the same parts in the different views. The drawings are intended as illustrative of the invention and not delimiting of its scope.

DESCRIPTION OF THE INVENTION

FIG. 1 shows a strip chart recorder. Paper supply roller 1 furnishes thermally responsive strip chart paper for use in the recorder. Paper 2 is similar to that described in U.S. Pat. No. 3,539,375 and is of such nature that when contacted by a suitably heated device thermally actuated indicia appear.

Paper 2 extends from roller 1 over the apex of knife edge member 3, which extends transversely of paper 2, and across viewing platen 16. Drive roller 4 and pressure roller 5 which holds paper 2 in contact with roller 4 act in concert to pull paper 2 with a predetermined tension and linear velocity over knife edge 2 and across platen 16.

Galvanometric stylus 7 is mounted by suitable pivot 20 to frame 19 of the recorder. Thermal tip 6 is mounted on the distal end of stylus 7 and is in intimate contact with paper 2 where it passes over and is in tangential contact with the apex of knife edge member 3. Electrical signals, to which stylus 7 is responsive, are conducted from body function monitor 9 to stylus 7 through line 8. Indicia 18 is a typical representation of analog date recorded by stylus 7. The structure and function of stylus 7 are well known and understood by those skilled in the art.

TPH 10 is affixed to the distal end of cantilever member 11. It is positioned in thermal contact with the region of paper 2 in tangential contact with the apex of knife edge 3, thereby placing it in alignment with tip 6. Indicia 17 is typical of the data recorded in the margin of paper 2 by TPH 10. Indicia 17 is of course produced by actuating TPH 10 in response to electrical signals produced by alpha numeric input unit 13 over line 12. While indicia 17 is normally of alpha-numeric character it may of course encompass any digital code consistent with the matrix layout of TPH 10.

Cantilever member 11 may be affixed to recorder frame 19 through flange plate 21 by screw 22 or any other suitable fastening means. It is resiliently urged toward paper 2 by spring 14. Spring 14 affixed to frame member 15 of the recorder, may be replaced by a suitable biasing means for example a leaf spring and is depicted here mainly for ease of understanding. In one embodiment of the invention, a leaf spring is utilized to urge TPH 10 against paper 2 with a pressure of 80±20 grams. Spring force of course depends on the design of TPH 10 and may be varied accordingly.

Referring to FIGS. 2 and 3, TPH 10 comprises a substrate 23 of ceramic or other electrical insulative material. Into substrate 23 is deposited in well known manner a discreet matrix array 24 of electrically resistive material and conductive lines 26 for conducting electrical energy thereto. Lines 26 are identified as Com. and $R_1$ through $R_6$. Data is generated by the signal level, on or off, on $R_1$ through $R_6$, which level is determined by appropriate logic circuitry in input unit 13. When a line 26 is "on" a resistive element of matrix 24 heats up and effects an indicia 17 on paper 2.

To prevent base 23 from acting as a heat sink and thus producing signal noise, matrix 24 is insulated from base 23 by a suitable thermally nonconductive material while conductive lines 26 are electrically insulated by glass coating 25. TPH 10 has the following dimensions: A—0.60 inch, B—0.40 inch, C—0.025 inch, D—0.02 inch and E—10 inches, which dimensions may of course be varied to conform with design restraints and criteria.

Referring to FIG. 4, there is shown an enlarged view of the region of contact between TPH 10 and paper 2 as it extends over the apex of knife edge 3. TPH 10 affixed to the underside of arm 11 is positioned so as to place matrix 24 in tangential contact with paper 2 where it is in contact with knife edge 3. Dimension F, the required area of contact of matrix 24 is approximately 0.01 inch thereby allowing substantial leeway in the position of TPH 10, since the radius of curvature of the apex of knife edge member 3 is relatively large with respect to the contact perimeter. The chord length G of the apex is approximately 0.062 inch and the angle alpha is approximately 15°.

To further clarify the invention its structure might be considered in the context of a typical operation. Both TPH 10 and stylus tip 6 are mechanically adjusted so as to be aligned on the same transverse chart line thereby bringing indicia 17 and 18 into time registration. Standard function leads are attached to a patient and connected to body function monitor 9 and alpha-numeric input 13.

In response to body signals, stylus 7 is galvanometrically driven to produce an analog signal by heated tip 6 on paper 2, as the latter is linearly translated at selected velocities typically 25 or 50 mm/sec. Contemporaneously with recording analog data, digital signals may be generated by unit 13, which by appropriate energization of matrix 24 elements is modified and thermally imprinted on paper 2. In the embodiment of the invention, coded information may be imprinted approximately every 12 to 20 milli-seconds, encompassing a time between 6 and 10 milli-seconds to imprint and a cool time of between 6 and 10 milli-seconds. As heretofore indicated, the digitally coded data may be interrupted at any time to introduce alpha-numeric information. The latter being generated by selective energization of certain matrix 24 elements during successive imprint periods, e.g. a number 1 may be generated by the successive heating of a single element for predetermined number of imprint periods corresponding to the desired character length. Matrix 24 is energized from a voltage source of between 9 and 12 volts.

Thus is described improved apparatus capable of producing a plurality of medical analog and digital signals in time registration on a strip chart recorder without obstructing observation of the chart or encumbering the exterior of the unit.

I claim:

1. A medical data strip chart recorder comprising:
   a strip of thermally sensitive chart paper controlled to move across a viewing platen at a predetermined linear velocity;
   a knife edge member disposed transversely of the strip having at least a portion of its apex in contact therewith, the apex having a cord length and diameter greater than approximately 0.062 inch;
   a galvanometric stylus responsive to a medical signal having a heated tip on its distal end in contact with the strip in a region of contact with the apex of the knife edge, thereby recording analog signals relative to the medical signal; and
   a thermal printout head mounted to the distal underside of an extended cantilever arm having a matrix of resistively heated elements which when selectively energized imprint a predetermined digital code on the strip, the matrix comprising a single row of the heated elements, the row arrayed transversely of the strip having a dimension of approximately 0.1 inch in the transverse direction and a dimension of approximately 0.01 inch longitudinally of the strip, the arm being resiliently urged and positioned so as to place the head in contact with the strip in the region of contact with the knife edge, the head being transversely aligned with the heated tip and responsive to a second medical signal thereby imprinting on the strip digital indicia relative thereto in time registration with the analog signals.

2. The recorder of claim 1 wherein the code produces alpha-numeric characters upon successive energization of the matrix.

3. The recorder of claim 1 wherein the elements are energized by a voltage having a magnitude from approximately 9 volts to 12 volts and require a period of from 6 to 10 milli-seconds to imprint the indicia and a second period of from 6 to 10 milli-seconds to cool prior to being reenergized.

4. The recorder of claim 1 wherein the matrix comprises seven transversely arrayed thermal elements.

5. The strip chart recorder of claim 1 wherein the proximal ends of the stylus and arm are respectively affixed to a frame member of the recorder, and the thermal printout head is located so as to produce indicia in a margin of the strip.

6. The strip chart of claim 5 wherein the arm is resiliently urged into position by a cantilever leaf spring affixed to the frame member and extending along a portion of the arm and in juxtaposition therewith.

7. The recorder of claim 6 wherein the spring exerts a force of approximately 60 to 100 grams on the strip.

* * * * *